Jan. 21, 1969  F. J. ELL ETAL  3,422,960
GEAR AND RACK TOOL HOLDER
Filed Oct. 10, 1966
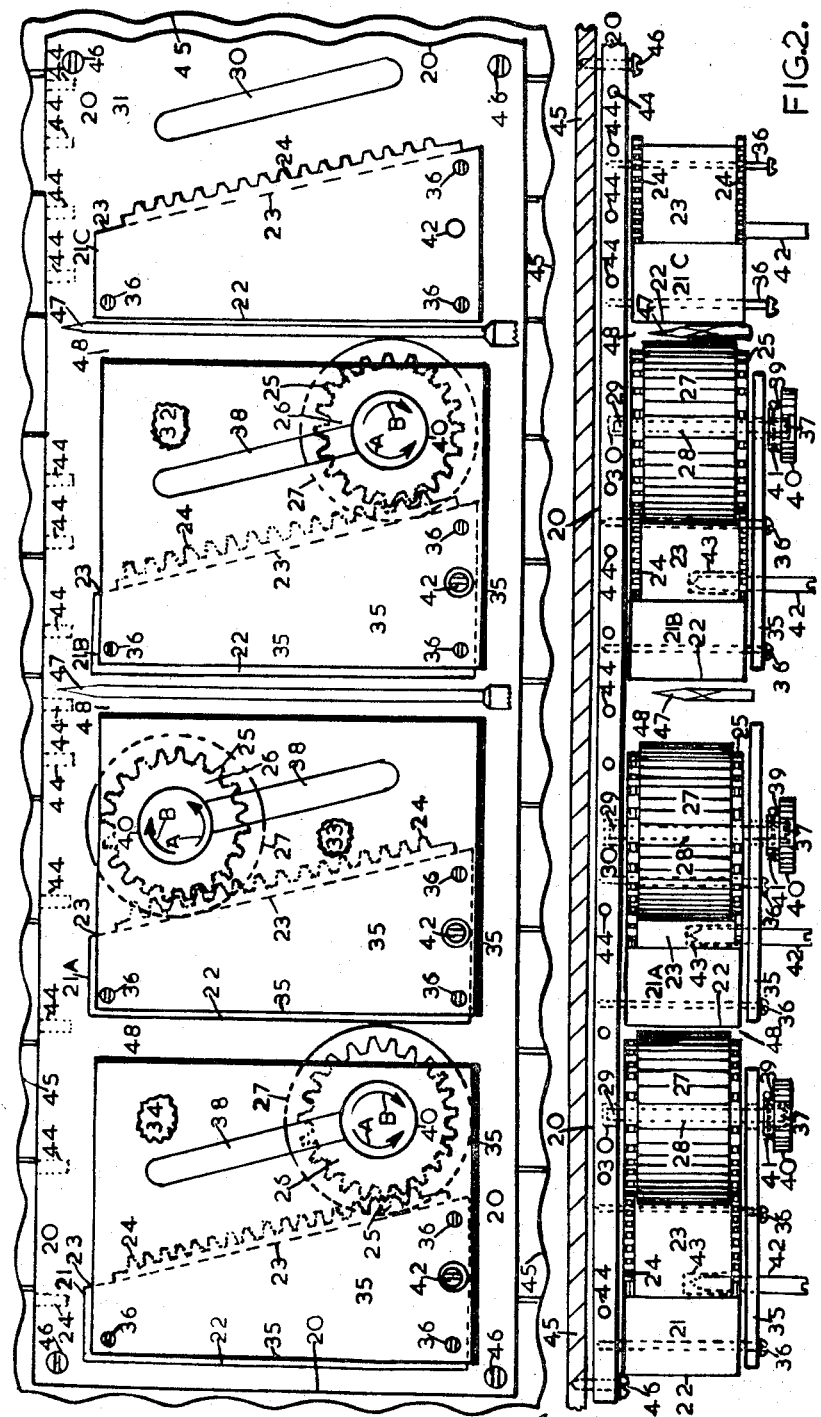
INVENTORS

United States Patent Office 3,422,960
Patented Jan. 21, 1969

3,422,960
GEAR AND RACK TOOL HOLDER
Fredrick James Ell, 1234 Argyle St., and Micheal
Klisowsky, 3427 Dewdney Ave., both of Regina,
Saskatchewan, Canada
Filed Oct. 10, 1966, Ser. No. 591,665
U.S. Cl. 211—60          1 Claim
Int. Cl. B25h 3/04; A47g 29/08; A44b 21/00

ABSTRACT OF THE DISCLOSURE

A gear and rack tool holder comprising a longitudinal board designed to be affixed to a wall, having a plurality of blocks being perpendicular on one of their ends and sloping on their other ends, and being spaced apart to provide room for circumferentially geared cylinders which mesh with two racks of cogs provided on the sloping ends of said blocks, whereby tools may be held between the cylinders and the adjacent perpendicular ends of the blocks.

---

The present invention now entitled "Gear and Rack Tool Holder," is a continuation-in-part of our United States application filed June 13, 1966, under Ser. No. 563,322 entitled "Gravity Controlled Tool Holder," such application now having been abandoned.

The gear and rack tool holder as hereinafter described by specification and illustration is designed to be secured to the wall of a house kitchen, machine shop and the like, to hold knives, saws, wrenches and many other tools used in kitchens and machine shops.

An object has been to provide a tool holder composed of a plurality of blocks attached to a longitudinal board which is to be secured to the wall of a kitchen or machine shop in horizontal position, and the blocks are perpendicular on one of their ends, and sloping on their other ends and spaced apart to provide room for manually operated geared cylinders to travel up and down on racks controlling the geared cylinders which contacts tools and presses them against the perpendicular ends of the blocks, thereby holding the tools in hanging position.

A further object has been provided openings between the blocks to allow saws or the handles of tools to be placed sideways into the tool holder so that the handles of saws and other tools do not take up unnecessary wall space below the tool holder, also that the tools are not to be inserted into the tool holder from the bottom upwards, but long tools such as hand saws and the like may project well above the tool holder.

With the above more important objects in view and such other minor objects as may appear as the specification proceeds, our invention consists essentially in he arrangement and construction of parts being had to the accompanying drawings, in which:

FIGURE 1, is a horizontal side view in elevation of our gear and rack tool holder secured to a wall.

FIGURE 2, is a top plan or bird's-eye view in elevation of FIGURE 1.

Like reference numerals and letter characters refer to like parts throughout the specification and drawings.

Referring to the drawings a gear and rack tool holder according to our invention comprises a longitudinal board 20, having secured thereon a plurality of blocks 21, 21A, 21B and 21C, and the left hand ends 22 of the blocks 21, 21A, 21B and 21C are perpendicular but, the right hand ends 23 of the blocks 21, 21A, 21B and 21C are vertically inclined or sloping, and each sloping end 23 of the blocks 21, 21A, 21B and 21C have positioned thereon two racks or rows of cogs 24 which may be cast integral with the blocks 21, 21A, 21B and 21C if the blocks are made of plastic or aluminum, and the racks or cogs 24 project from the sloping planes 23 of the blocks 21, 21A, 21B and 21C to engage the cogs 25 of the circumferential cylinder gears 26, and the gears 26 and cylinders 27 may be cast integral if made from aluminum or plastic. The cylinder gears 26 are slightly less in diameter than the cylinders 27, and the cylinders 27 travel on the sloping right hand ends 23 of the blocks 21, 21A and 21B as seen in FIGURE 1, and the cylinders 27 are much greater in their planes of circularity than in their planes of rotary axis. Each geared cylinder 27 is supported by a spindle 28 in fixed position through its central rotary axis and, the inner shorter ends 29 of the spindles 28 reciprocates with an upward and downward movement within vertically inclined or sloping slots 30 which are rabbeted or milled out of the inside of the longitudinal board 20 as seen in compartment 31 FIGURE 1, and the reciprocating movements of the inner shorter ends 29 of the spdinles 28 within the slots 30 are caused by the geared cylinders 27 moving up and down the racks 24. Each geared cylinder 27 operates in its own compartment and the compartments are numbered from right to left by the following numerals 31, 32, 33 and 34, and compartments 32, 33 and 34 are closed in by slabs 35 which are placed over the outer sides of the blocks 21, 21A and 21B, and screws 36 go through the slabs 35 and through the blocks 21, 21A and 21B, and into the longitudinal board 20 securing the blocks 21, 21A and 21B and the slabs 35 to the longitudinal board 20 which also forms the inside wall of the compartments 32, 33 and 34 more easily visualized in FIGURE 2, and the outer longer ends 37 of the spindles 28 of the cylinders protrude through the vertically inclined or sloping slots 38 in the slabs 35 and into the hubs 39 of the spindle control buttons or knobs 40, and cotter pins 41 go through the button hubs 39 and the spindle longer ends 37 to cause the spindle control buttons or knobs 40 to be in fixed position on the ends 37 of the spindles 28 so that the geared cylinders 27 within their compartments may be manually turned up and down the sloping racks or rows of cogs 24 by the operator turning the buttons or knobs 40 with his left hand. There are pegs or pins 42 inserted through the slabs 35 and blocks 21, 21A and 21B and they may be driven into apertures 43 prepared in the blocks 21, 21A and 21B, or they may be screwed into the apertures 43 illustrated in FIGURE 2 or they may be cast integral with the blocks as illustrated on block 21C, and many kinds of tools may be hung on these pegs or pins 42. There are a plurality of apertures 44 drilled out of the upper edge of the longitudinal board 20 wherein punches and the like may be placed, see FIGURE 1 and FIGURE 2. The slab 35 and the geared cylinder has been removed from block 21C to more clearly expose into view the block 21C illustrating the racks or rows of cogs 24 and the vertically inclined or sloping slot 30 which is rabbeted or milled out of the inside of the longitudinal board 20, and there is one of these slots 30 in the longitudinal board oppositely positioned to each slot 38 in the slabs 35 to receive the inner shorter ends 29 of the spindles 28.

OPERATION

Secure the rack and gear tool holder to the wall 45 by screws 46; with the left hand turn the button or knob 40 in the direction of the arrow A till the geared cylinder 27 is at its highest point in the compartment 33 and with the right hand place the knife blade 47 sideways into space 48, then turn the knob or button 40 in the direction of the arrow B which causes the geared cylinder to roll down the slope 23 and contact the knife blade 47 and jam the knife blade against the vertical wall 22 of the following block 21C thus holding the knife 47 in a hanging position, and the end gears 26 of the cylinder prevents the cylinder from slipping around on the sloping end surface 23 of the block 21B and letting the knife fall out of the tool holder.

It will be understood of course, that many modifications may be made in the preferred embodiment of the invention described and illustrated herein without in any way departing from the spirit and scope of the invention.

Having thus described our invention what we claim and desire to protect by Letters Patent of the United States is:

1. A gear and rack tool holder comprising a longitudinal board having secured thereon a plurality of blocks standing perpendicular at their rearward ends on said longitudinal board and sloping on their forward ends, and two racks of cogs mounted in spaced position on said sloping forward ends, circumferential geared cylinders adapted to mesh with said racks of cogs to allow said circumferential geared cylinders to traverse the said racks of cogs while being manually turned, and spindles in fixed position through the central rotary axis of said circumferential geared cylinders, said spindles each having a longer end and a shorter end, sloping slots in the inward side of said longitudinal board, sloping slots in slabs which are secured to said blocks in alignment with said sloping slots in said longitudinal board, the shorter ends of said spindles projecting into said sloping slots in the inward side of said longitudinal board and the longer ends of said spindles projecting through the sloping slots in said slabs and, knobs mounted in fixed position on said longer ends of said fixed spindles to allow manual turning of the said fixed spindles and said circumferential geared cylinders till said circumferential geared cylinders contact and force tools against the said perpendicular rearward ends of said blocks, thus holding said tools in hanging position.

References Cited

UNITED STATES PATENTS

| 1,414,541 | 5/1922 | Arey et al. | 24—244 |
| 1,485,092 | 2/1924 | Rauchut | 24—244 |
| 1,674,581 | 6/1928 | Webb | 24—244 |
| 3,071,252 | 1/1963 | Hanschar | 211—60 |
| 3,270,416 | 9/1966 | Massa | 211—69 X |

FOREIGN PATENTS 61,143 9/1912 Switzerland.

CHANCELLOR E. HARRIS, *Primary Examiner.*

U.S. Cl. X.R.

248—113; 24—244